May 29, 1962   M. F. KOENIG   3,037,153
CIRCUIT BREAKER PANEL ASSEMBLY

Filed Sept. 16, 1958   3 Sheets-Sheet 1

Inventor
Martin F. Koenig
By H R Rather
Attorney

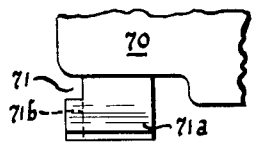
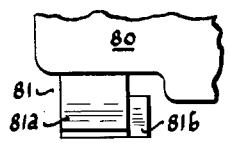
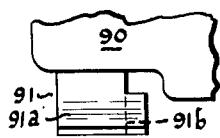
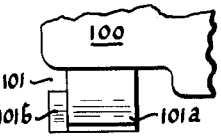
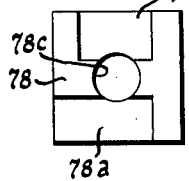
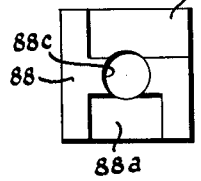
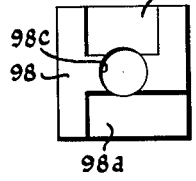
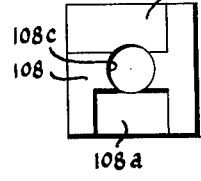
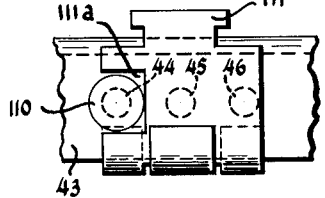
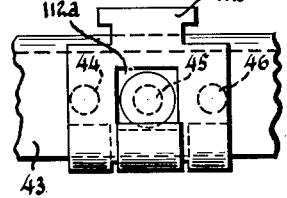
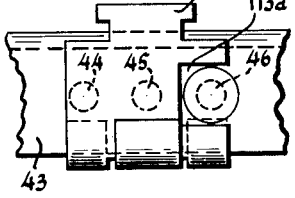
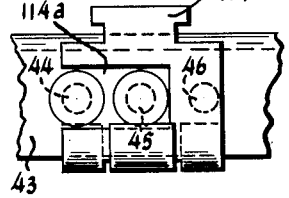
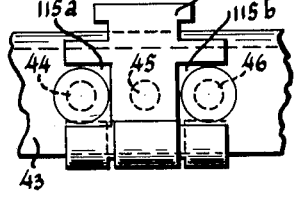
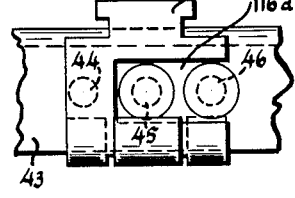
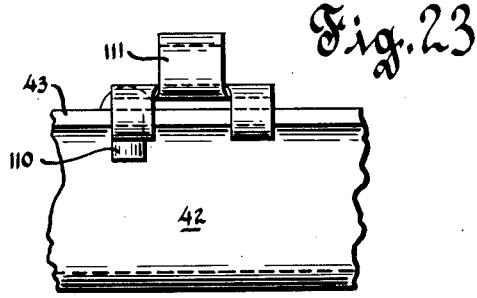

May 29, 1962 M. F. KOENIG 3,037,153
CIRCUIT BREAKER PANEL ASSEMBLY
Filed Sept. 16, 1958 3 Sheets-Sheet 3

Inventor
Martin F. Koenig
By H R Rather
Attorney

United States Patent Office 3,037,153
Patented May 29, 1962

3,037,153
CIRCUIT BREAKER PANEL ASSEMBLY
Martin F. Koenig, Milwaukee, Wis., assignor to Cutler-Hammer, Inc., Milwaukee, Wis., a corporation of Delaware
Filed Sept. 16, 1958, Ser. No. 761,312
6 Claims. (Cl. 317—119)

This invention relates generally to panel mounted electrical devices. More particularly it relates to means for preventing replacement of a particular panel mounted circuit breaker of a given electrical capacity by another circuit breaker which has a different electrical capacity.

In the manufacture of so-called domestic type circuit breakers, it is common practice, in the interests of economy, efficient and adaptability, to provide circuit breakers which have substantially different electrical load capacities and tripping points but which are substantially identical with respect to their extrenal shapes and physical dimensions. Such circuit breakers are usually interchangeable on a mounting panel. If a circuit breaker of a given load capacity and tripping point is employed to protect a particular electrical circuit, inadvertent or intentional replacement of that circuit breaker by another which has a relatively higher load capacity and tripping point results in the circuit involved being improperly protected. Subsequent loading of that circuit may create a dangerous fire hazard before the circuit breaker trips. It is not desirable from the commercial standpoint to manufacture a line of circuit breakers wherein devices of different load capacity and tripping point differ extensively from each other so that replacement of one by the other is impossible. Neither is it desirable to provide circuit breakers which are adapted to make their removal from a panel difficult in order to discourage intentional replacement of low capacity breakers by those of higher capacity.

Accordingly, it is an object of this invention to provide improved means for preventing panel mounted electrical devices having a given electrical capacity being replaced by other devices having different electrical capacities.

Another object is to provide improved means for preventing a panel mounted circuit breaker having a given electrical capacity and tripping point from being replaced by another circuit breaker having a greater electrical capacity and higher tripping point.

Still another object is to provide improved means of the aforesaid character which comprise improved adapters for association with a circuit breaker mounting panel and a circuit breaker mounted thereon.

A further object is to provide improved adapters of the aforesaid character which are employed with circuit breakers having portions which have been slightly modified to complement the shape of the adapters.

A still further object is to provide improved means of the aforesaid character which are readily adapted to be installed on panel assemblies in the field without the use of special tools or techniques.

Other objects and advantages of the invention will hereinafter appear.

The accompanying drawings illustrate preferred embodiments of the invention, it being understood that the embodiments illustrated are susceptible to changes with respect to certain details thereof without departing from the scope of the appended claims.

In the drawings:
FIGURE 1 is a top plan view of a portion of the panel assembly upon which a circuit breaker is mounted;

FIG. 2 is an enlarged elevational view of the left hand side of the panel assembly and circuit breaker shown in FIG. 1;

FIG. 3 is a view, partly in elevation and partly section, of the lower end of the panel assembly and circuit breaker shown in FIG. 1;

FIG. 4 is an enlarged elevational view of the right hand side of the panel assembly and circuit breaker shown in FIG. 1;

FIG. 5 is an enlarged elevational view of the electrical terminal member of the circuit breaker shown in FIG. 3;

FIG. 6 is an enlarged top plan view of an adapter block incorporating the invention;

FIG. 7 is an enlarged isometric view of the adapter block shown in FIG. 6;

FIG. 8 is a cross-sectional view of the adapter block shown in FIGS. 6 and 7, taken on the line 8—8 of FIG. 7, showing certain modification therewithin;

FIGS. 9, 10, 11 and 12 are enlarged elevational views, similar to FIG. 5, of the electrical terminal members of a set of circuit breaker devices which have been modified in accordance with one embodiment of the invention;

FIGS. 13, 14, 15 and 16 are enlarged top plan views, similar to FIG. 6, of a set of adapter blocks incorporating the invention and intended for use with the circuit breaker devices shown in FIGS. 9 through 12;

FIGS. 17, 18, 19, 20, 21 and 22 are enlarged top plan views of the mechanical hooking member of a set of circuit breaker devices of the type shown in FIGS. 1, 2, 3 and 4, showing how the hooking members are modified to carry out a second embodiment of the invention;

FIG. 23 is an enlarged elevational view of the hooking member shown in FIG. 17;

Figure 24:
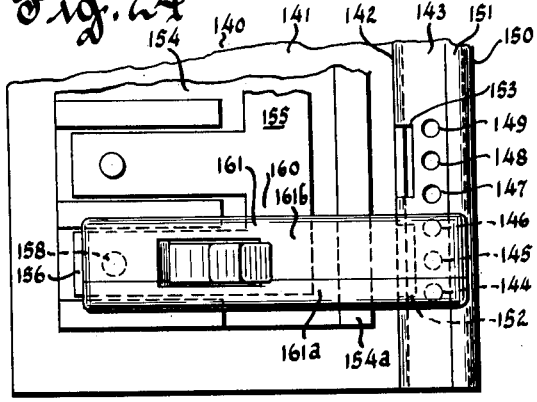
FIG. 24 is a top plan view of a portion of a panel assembly, similar in some respects to the panel assembly shown in FIG. 1, upon which a circuit breaker, similar in some respects to the circuit breaker shown in FIG. 1, is mounted.

The present invention contemplates a set of circuit breaker devices which are substantially identical in external physical respects but which have different load carrying capacities and tripping points. Each circuit breaker has an electrical terminal member which is adapted to engage, both mechanically and electrically, with an electrically conductive contact member on a circuit breaker mounting panel assembly. Each circuit breaker is further provided with a portion which is adapted to be mechanically associated with a portion of the panel assembly. Normally, each circuit breaker in the set would be mechanically interchangeable on the panel assembly with any other in the set. To prevent one circuit breaker in the set from being replaced by another, particularly by another which has a greater load carrying capacity and higher tripping point, a particular part of each circuit breaker in a set is modified slightly during manufacture in accordance with the invention so that the configuration thereof differs from that of the others. The configuration of each modified part is determined in accordance with the load carrying capacity and tripping point of its respective circuit breaker. Each circuit breaker is then provided with an adapting member (or members) formed in accordance with the invention and having a configuration which is compatible with that of the modified part of the circuit breaker. The adapting member (or members) can be readily connected to a part of the panel assembly which is closely associated with the modified part of a circuit breaker when the latter is placed thereon. Once the adapter member is so connected, however, it cannot be removed. Thereafter, only a circuit breaker having a part whose configuration is compatible with that of the adapter member or members employed can be properly associated with the panel assembly. Thus, replacement of one circuit breaker by another of a greater load carrying capacity and higher tripping point is prevented.

Three embodiments of the invention are disclosed herein. In the first embodiment, the electrical terminal members of a set of circuit breaker devices are modified in accordance with the invention and a set of adapter blocks which have shapes complemental to the shapes of the terminal members are provided for attachment to an electrically conductive portion of the panel assembly. In the second and third embodiment, the mechanical hooking or mounting members of a set of circuit breaker devices are modified in accordance with the invention and pin members are provided for attachment to a portion of the panel assembly which is adapted to be associated with the hooking or mounting members of the circuit breaker. As will hereinafter appear, the basic panel assembly and circuit breaker devices with which the first and second embodiment are employed are substantially identical.

FIGS. 1, 2, 3 and 4 show a portion of a typical mounting panel assembly 40 and a typical circuit breaker device 60 with which the first and second embodiment of the present invention may be employed.

Panel assembly 40, which may be assumed to be adapted for mounting within a suitable enclosure cabinet (not shown), comprises a rigid sheet metal mounting plate 41 which has an upwardly bent side portion 42 which terminates in a flange 43. Flange 43 is provided with groups of spaced-apart holes such as 44, 45 and 46, and 47, 48 and 49, which play no part in the first embodiment of the invention and which are employed in the second embodiment of the invention as will hereinafter be explained.

An insulating board 50, preferably formed by molding from suitable electrical insulating material such as "Bakelite" is rigidly secured to mounting plate 41 by suitable means (not shown). Insulating board 50 is provided with an integrally formed, longitudinal projection 51 which extends from the face thereof and lies parallel to portion 42 of plate 41. Projection 51 serves as a support for the bottom wall 61c of the housing 61 of circuit breaker 60. Insulating board 50 is further provided with a multiplicity of integrally formed, spaced apart projections such as 52, 53 and 54 which extend from the face thereof somewhat higher than projection 51 and lie at right angles to the latter. Projections 52 and 53, for example, are adapted to be accommodated by the recesses 62 and 63 respectively, which are formed in the side walls of the housing 61 of circuit breaker 60 and serve to locate and support the circuit breaker. An electrically conductive bus bar 55 which has a plurality of integrally formed fingers such as 56 and 57 extending at right angles therefrom is rigidly secured to the face of insulating board 50 by suitable means (not shown). The fingers 56 and 57 lie between projections 52 and 53, and 53 and 54, respectively, and each is provided with an upstanding, electrically conductive, substantially cylindrical contact posts 58 and 59, respectively, which are rigidly secured thereto and which are adapted to engage with the electrical terminal members 67 of circuit breaker 60.

Circuit breaker 60, which is removably mounted on panel assembly 40, comprises an insulating housing 61 which is preferably formed by securing together two separately molded sections 61a and 61b. The bottom wall 61c of housing 61 of circuit breaker 60 is provided with an integrally formed projection 64 which abuts portion 42 of plate 41 of panel assembly 40. Projection 64 assists in supporting the circuit breaker on the panel assembly 40.

Circuit breaker 60 is also provided with a rigidly attached hooking member 65 which is preferably formed of sheet metal. Hooking member 65 comprises a main portion 65a (which is channeled as shown in FIG. 3 to eliminate play) from one edge of which there extends an integrally formed T-shaped portion 65b (best seen in FIG. 1) which is adapted to be entrapped within a chamber (not shown) formed within projection 64 when the sections 61a and 61b of housing 61 are brought together. An upwardly bent, reversely curved hook portion 65c extends from the opposite edge of main portion 65a and is adapted to engage a notch 66a provided in the mouth of exhaust port 66 of housing 61. The T-shaped portion 65b and the hook portion 65c of hooking member 65 act to secure the latter to housing 61. Two downwardly bent, reversely curved hook portions 65d and 65e also extend from the opposite edge of main portion 65a and are adapted to engage flange 43 of plate 41 of panel assembly 40.

Circuit breaker 60 is further provided with an outwardly projecting, electrically conductive, bifurcated terminal member 67 which is adapted to engage, electrically and mechanically, with contact post 58 on finger 56 of bus bar 55. Terminal member 67 is mechanically secured to housing 61 by entrapment within a chamber (not shown) formed within housing 61 when the sections 61a and 61b are brought together and is electrically connected to electrical members (not shown) therewithin. Terminal member 67 comprises two relatively resilient legs 67a and 67b which converge inwardly toward each other so as to firmly engage opposite sides of contact post 58, as FIG. 2 best shows. FIG. 2 is an enlarged elevational view of terminal member 67 showing that both of its legs 67a and 67b are of equal width.

Circuit breaker 60 is removable from panel assembly 40 by first pivoting it in a clockwise direction (with reference to FIG. 3) to disengage terminal member 67 from contact post 58, to free housing 61 from engagement between projections 52 and 53, and to slide projection 64 above portion 42 of plate 41, and then disengaging hooking member 65 from flange 43 of plate 41.

The first embodiment of the invention is carried out by providing, for example, four other circuit breaker devices 70, 80, 90 and 100, shown in FIGS. 9, 10, 11 and 12, respectively, which may be assumed to have the same general configuration as circuit breaker device 60 hereinbefore described and which may be further assumed, for example, to have load carrying capacities of 30, 40, 50 and 60 amperes, respectively. It may be assumed that circuit breaker device 60 has a load carrying capacity of 20 amperes. The bifurcated terminal members 71, 81, 91 and 101 of the circuit breakers 70, 80, 90 and 100 respectively, have been modified as follows.

As FIG. 9 shows, leg 71b of terminal member 71 is identical to leg 67b but leg 71a has a portion which extends beyond the left hand edge of leg 71b.

As FIG. 10 shows, leg 81a is identical to leg 67a but leg 81b has a portion which extends beyond the right hand edge of leg 81a.

As FIG. 11 shows, leg 91b is identical to leg 67b but leg 91a has a portion which extends beyond the right hand edge of leg 91b.

As FIG. 12 shows, leg 101a is identical to leg 67a but leg 101b has a portion which extends beyond the left hand edge of leg 101a.

FIGS. 6, 13, 14, 15 and 16 show top plan views of a set of adapter members 68, 78, 88, 98 and 108, respectively, which are made in accordance with the invention and which are normally employed with the bifurcated terminal members 67, 71, 81, 91 and 101, respectively, and with contact post 58 of panel assembly 40. FIG. 7 is an enlarged isometric view of adapter member 68 shown in FIG. 6 and illustrates the manner in which it is employed with contact post 58. Adapter member 68 is fairly representative of the four other adapter members 78, 88, 98 and 108. Each cube-like adapter member 68, 78, 88, 98 and 108 is preferably formed by molding from tough, somewhat resilient, electrical insulating material such as nylon or the like and each is provided with a substantially cylindrical hole 68c, 78c, 88c, 98c and 108c, respectively, which extends through the center thereof and which adapts it for placement on contact post 58 of panel assembly 40. The diameter of each hole initially should be slightly smaller than that of contact post 58 to afford tight frictional engagement when the adapter member is placed on the post thus making removal of the adapter member from the post difficult, if not impossible. If preferred, small metallic gripper teeth such as 68d and 68e angularly disposed in member 68, as shown in FIG. 8, may be embedded in the adapter member to make removal thereof from the post 58 even more difficult. Each adapter member 68, 78, 88, 98 and 108 is provided with a pair of cut outs which adapt it to accommodate the modified bifurcated terminal members 67, 71, 81, 91 and 101, respectively.

Thus, as FIG. 6 shows, cut outs 68a and 68b of adapter member 68 can accommodate the legs 67a and 67b, respectively, of terminal member 67 shown in FIG. 5.

As FIG. 13 shows, cut outs 78a and 78b of adapter member 78 can accommodate the legs 71a and 71b, respectively, of terminal member 71 shown in FIG. 9.

As FIG. 14 shows, cut outs 88a and 88b of adapter member 88 can accommodate the legs 81a and 81b, respectively, of terminal member 81 shown in FIG. 10.

As FIG. 15 shows, cut outs 98a and 98b of adapter member 98 can accommodate the legs 91a and 91b, respectively, of terminal member 91 shown in FIG. 11.

As FIG. 16 shows, cut outs 108a and 108b of adapter member 108 can accommodate the legs 101a and 101b, respectively, of terminal member 101 shown in FIG. 12.

As FIG. 7 makes clear, the cut outs extend sufficiently far into the adapter member so as to communicate with the cylindrical hole through the center thereof so that when the adapter member is placed on post 58 the opposite side portions of the latter are exposed and can make electrical contact with the legs of the bifurcated terminal member which has been adapted to match the cut outs. The width (dimension A in FIG. 7) of each adapter member is such that when employed on post 58 of panel 40 the member will fit between the spaced-apart projections 52 and 53 of insulating board 50 but cannot be rotated on the post to a reversed position. This feature is important because from the manufacturing standpoint, adapter member 78 is identical to member 88 but is rotated 180° in use, as FIGS. 13 and 14 make clear. Similarly, adapter member 98 is identical to member 108 but is rotated 180° in use, as FIGS. 15 and 16 make clear.

The circuit breakers 60, 70, 80, 90 and 100 can be interchangeably mounted on panel assembly 40 even though their respective terminal members have been modified, provided, of course, that no adapter member is placed on post 58. If adapter member 68 is employed only circuit breaker 60 can be properly associated with the panel assembly. If adapter member 78, 88, 98 or 108 is employed only a circuit breaker having a terminal member whose shape is complimentary thereto can be properly associated therewith i.e., circuit breakers 70, 80 90 or 100. Note, however, that low rated breaker 60 could be employed no matter which of the blocks were employed because of the particular shape of its terminal. Thus, only circuit breakers having the same or lower electrical ratings (and, of course, the same modification) can be used to replace a particular breaker and accidental or intentional replacement of one circuit breaker by a higher rated breaker is prevented whereas initial replacement of a defective breaker by one of the same or lower rating is not hampered.

The second embodiment of the invention is carried out by providing, for example, six circuit breaker devices (not shown) which may be assumed to have the same general configuration as circuit breaker device 60 hereinbefore described, and which may be further assumed, for example, to have load carrying capacities of 70, 60, 50, 40, 30 and 20 amperes, respectively. Each of the six circuit breakers is adapted to be provided with a hooking member such as member 65 hereinbefore described but which has been modified in accordance with the invention as shown in FIGS. 17, 18, 19, 20, 21 and 22. These modifications, which comprise cut out portions hereafter described, are provided to accommodate the hemispherical heads of pin members, such as the pin member 110 shown in FIG. 23, which are adapted to be inserted in the holes 44, 45 and 46 provided in flange 43 of panel assembly 40. Preferably, the pin members are drive screws or similar devices which are adapted so as to be relatively easily inserted into the holes (as in the field and without special tools) but difficult, if not impossible to remove once in place. If the main portion of the hooking members were not modified, placement of a pin member in any of the holes 44, 45 or 46 would interfere with engagement of the hooking member with the flange and would prevent the circuit breaker from being properly associated with the panel assembly.

As FIG. 17 shows, hooking member 111 is provided with a cut out 111a which is adapted to accommodate the head of the pin member in hole 44 of flange 43.

As FIG. 18 shows, hooking member 112 is provided with a cut out 112a which is adapted to accommodate the head of the pin member in hole 45 of flange 43.

As FIG. 19 shows, hooking member 113 is provided with a cut out 113a which is adapted to accommodate the head of the pin member in hole 46 of flange 43.

As FIG. 20 shows, hooking member 114 is provided with a cut out 114a which is adapted to accommodate the heads of two pin members in holes 44 and 45 of flange 43.

As FIG. 21 shows, hooking member 115 is provided with two cut outs 115a and 115b which are adapted to accommodate the heads of pin members in holes 44 and 46, respectively, of flange 43.

As FIG. 22 shows, hooking member 116 is provided with cut out 116a which is adapted to accommodate the heads of pin members in holes 45 and 46 of flange 43.

The six circuit breakers (not shown) provided with the modified hooking members 111, 112, 113, 114, 115 and 116 can be interchangeably mounted on panel assembly 40 even though their hooking members have been modified, provided, of course, that no pin members are placed in the holes in flange 43. Assuming, however, that the pin arrangements shown in FIGS. 17 through 22 are employed, then only circuit breakers having hooking members adapted to accommodate them can be employed. Although hooking member 114 can be employed with the pin arrangement shown in FIGS. 17 and 18 as well as that shown in FIG. 20, it is clear that substitution of a circuit breaker of lower capacity for one of higher capacity would result in no danger if unintentionally carried out. Similarly, hooking member 115 can be employed with the pin arrangements shown in FIGS. 17 and 19 as well as that shown in FIG. 21 and hooking member 116 can be employed with the pin arrangements shown in FIGS. 18 and 19 as well as that shown in FIG. 22.

Thus, accidental or intentional replacement of one circuit breaker by another of a higher load carrying capacity is prevented but intentional replacement of a defective breaker by one of the same or lower rating is in no way hampered.

Figure 25:
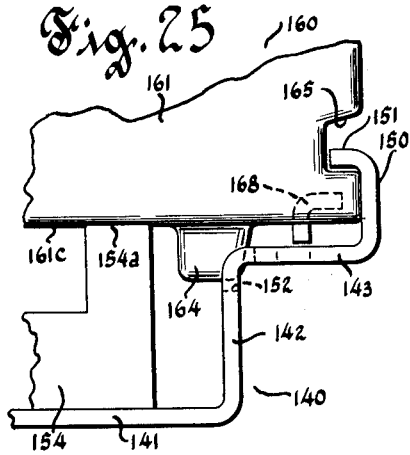
FIG. 25 is an enlarged side elevational view of a portion of the panel assembly and circuit breaker shown in FIG. 24.

The third embodiment of the invention is carried out upon a circuit breaker device 160 and a panel assembly 140 of the type shown in FIGS. 24 and 25. Panel assembly 140 is substantially similar to panel assembly 40 hereinbefore described but is provided with a mounting plate 141 which differs in certain respects from mounting plate 41 hereinbefore described. Thus, mounting plate 141 has an upwardly bent side portion 142. Integral with side portion 142 is a flat portion 143 which has an upwardly bent portion 150 which terminates in an inwardly bent lip 151. The flat portion 143 is provided with groups of spaced-apart holes such as 144, 145 and 146, and 147, 148 and 149. The plate 141 is further provided along the edge where upwardly bent side portion 142 joins flat portion 143 with a plurality of spaced apart slots, such as 152 and 153. Panel assembly 140 further comprises an insulating board 154 and a bus bar 155 which may be assumed, for purposes of illustration, to be identical to the insulating board 50 and bus bar 55 hereinbefore described in connection with FIGS. 1, 2 and 3. The finger 156 of bus bar 155 is provided with a contact post 158 similar to contact post 58 hereinbefore described.

Circuit breaker 160, which is removably mounted on panel assembly 140 is similar in most respects to the circuit breaker 60 hereinbefore described. It will be apparent, however, that circuit breaker 160 is not provided with a hooking member, such as hooking member 65 employed with circuit breaker 60, but instead is provided with an indentation 165 which is formed in its casing 161, as FIG. 25 shows, and is adapted to accommodate the inwardly bent lip 151 of plate 141 of the panel assembly 140. The bottom wall 161c of housing 161 of circuit breaker 160, which rests on projection 154a of insulating board 154, is provided with an integrally formed projection 164 which is adapted to fit within the slot 152 of plate 141 of the panel assembly 140 and aids in properly locating the circuit breaker on the panel assembly and in holding it in position. Circuit breaker 160 may be assumed to be provided with an electrical terminal member (not shown) which is identical to terminal member 67 hereinbefore described in connection with circuit breaker 60 and which is adapted to engage the contact post 158 of panel assembly 140. Circuit breaker 160 is also provided with a relatively small member 168 which is rigidly secured to housing 161 of circuit breaker 160 substantially below the indentation 165 formed in the housing, as FIG. 25 makes clear. As FIG. 25 shows, the member 168 normally has an L-shaped cross-sectional configuration and is secured to the circuit breaker 160 by having a portion thereof entrapped within a cavity (not shown) formed within the housing 161 formed when the two moulded halves 161a and 161b thereof are brought together. Another portion of member 168 extends outwardly from the bottom wall 161c of housing 161 and is adapted to rest on the surface 143 of plate 141 of panel assembly 140 and serves to maintain a relatively snug engagement between the indentation 165 and the lip 151 so that the circuit breaker is supported firmly on the panel assembly.

The third embodiment of the invention is carried out by providing, for example, six circuit breaker devices such as 170, 180, 190, 200, 210 and 220 shown in FIGS. 26 through 31, respectively, which may be assumed to have the same general configuration as the circuit breaker 160 hereinbefore described. It may further be assumed, for example, that the circuit breakers 170, 180, 190, 200, 210 and 220 have load carrying capacities of 70, 60, 50, 40, 30 and 20 amperes, respectively. Each of the six circuit breakers is provided with a member 171, 181, 191, 201, 211 and 221, respectively, which are similar to the member 168 hereinbefore described, but each member has been modified in accordance with the invention as shown in FIGS. 26 through 31. These modifications which comprise cut out portions hereinafter described, are provided to accommodate the hemispherical heads of pin members, such as the pin member 110 hereinbefore described in connection with the second embodiment of the invention, which are adapted to be inserted in the holes 144, 145, and 146 provided in the flat portion 143 of plate 141 of panel assembly 140. It is apparent that if the members 171, 181, 191, 201, 211 and 221 were not modified as shown but retained the shape of members 168, placement of a pin member in any of the holes 144, 145 or 146 would interfere with and prevent placement of the circuit breaker on the panel assembly.

Figure 26:
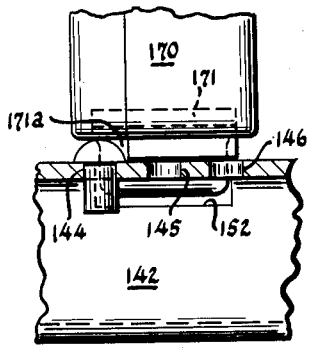
FIGS. 26, 27, 28, 29, 30 and 31 are enlarged end elevational views of the mounting members of a set of circuit breaker devices, similar to that shown in FIGS. 24 and 25, showing how they are modified in accordance with the invention to provide a third embodiment thereof.

As FIG. 26 shows, member 171 is provided with a cut out 171a which is adapted to accommodate the head of the pin member in hole 144 of flat portion 143.

Figure 27:
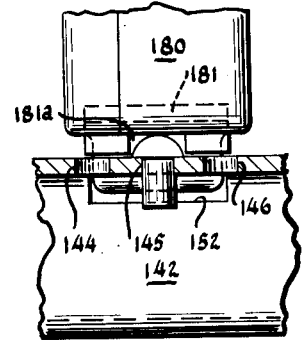

As FIG. 27 shows, member 181 is provided with a cut out 181a which is adapted to accommodate the head of the pin member in hole 145 of flat portion 143.

Figure 28:
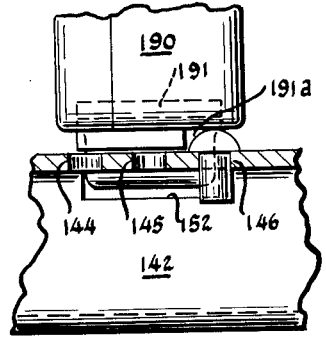

As FIG. 28 shows, member 191 is provided with a cut out 191a which is adapted to accommodate the head of the pin member in hole 146 of flat portion 143.

Figure 29:
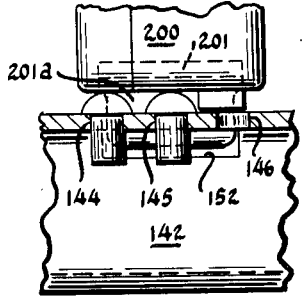

As FIG. 29 shows, member 201 is provided with a cut out 201a which is adapted to accommodate the heads of two pin members in holes 144 and 145 of flat portion 143.

Figure 30:
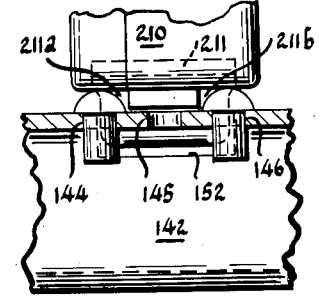

As FIG. 30 shows, member 211 is provided with two cut outs 211a and 211b which are adapted to accommodate the heads of two pin members in holes 144 and 146, respectively, of flat portion 143.

Figure 31:
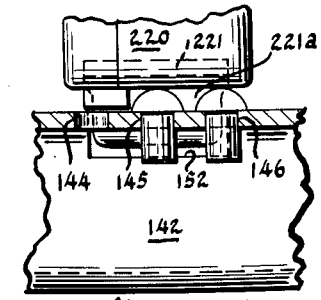

As FIG. 31 shows, member 221 is provided with a cut out 221a which is adapted to accommodate the heads of pin members in holes 145 and 146 of flat portion 143.

The six circuit breakers 170, 180, 190, 200, 210 and 220 provided with the members 171, 181, 191, 201, 211 and 221, respectively, can be interchangeably mounted on panel assembly 140 even though their members have been modified as shown, provided, of course, that no pin members are placed in the holes in flat portion 143. Assuming, however, that the pin arrangements shown in FIGS. 26 through 31 are employed, then only circuit breaker having members adapted to accommodate them can be employed. Although member 201 can be employed with the pin arrangements shown in FIGS. 26 and 27 as well as that shown in FIG. 29, it is clear that substitution of a circuit breaker of lower capacity for one of higher capacity would result in no danger if unintentionally carried out. Similarly, member 211 can be employed with the pin arrangements shown in FIGS. 26 and 28 as well as that shown in FIG. 30 and member 221 can be employed with the pin arrangements shown in FIGS. 27 and 28 as well as that shown in FIG. 31.

Thus, accidental or intentional replacement of one circuit breaker by another of a higher load carrying capacity is prevented but intentional replacement of a defective breaker by one of the same or lower rating is in no way hampered.

I claim:

1. In combination, a circuit breaker having bifurcated spring clip terminal member which has a predetermined configuration in accordance with the rated electrical load capacity of the circuit breaker, a panel assembly upon which said circuit breaker is removably mounted, said panel assembly being provided with a conductive bus having an upstanding terminal post to be engaged by said terminal member of said circuit breaker, and a device formed of insulating material to be permanently attached to said terminal post, said device having a central aperture to accommodate said terminal post with a force fit and having recesses on opposite sides thereof exposing portions of said terminal post on opposite sides of the latter, and said device having portions bounding said recesses complementally arranged in accordance with the predetermined configuration of said terminal member so that said terminal member can straddle said terminal post in good electrical gripping engagement along said exposed portion of the latter while blocking attachment to said terminal post of non-complemental terminal members of circuit breakers having different rated load capacities.

2. The combination according to claim 1 wherein said portions of said device are so arranged that terminal members of circuit breakers of a predetermined or lower load capacity can straddle said terminal post in good electrical gripping engagement while blocking attachment to the latter of terminal members of circuit breakers of higher rated load capacity.

3. The combination according to claim 1 wherein a metallic member having teeth projecting into said aperture of said device is embedded in place in the latter and engages its teeth with said terminal post when said device is force fitted thereabout to make removal of said device from said terminal post more difficult.

4. The combination according to claim 1 wherein said recesses in said device open to said opposite sides and the top of the latter and wherein said portions of said devices are arranged so that they close the opposite ends of both of said recesses to only permit a terminal member of a circuit breaker having jaws of the same width to straddle said terminal post in good electrical gripping engagement.

5. The combination according to claim 1 wherein said recesses in said device open to said opposite side and the top of the latter and wherein said portions of said devices are arranged so that they close the opposite ends of one recess and only one end of the other recess to permit either a circuit breaker having terminal member jaws of the same width or a circuit breaker having one terminal jaw wider than the other that is positioned to fit in said other recess to straddle said terminal post in good electrical gripping engagement.

6. The combination according to claim 1 wherein said terminal post is cylindrical, wherein said device is provided with a substantially square base and a portion separating said recesses which extends transversely from said base and engages said terminal post throughout a greater portion of its length on opposite sides of the latter substantially at a right angle to the exposed sides of said terminal post, and wherein said portions of said device extend transversely from said base and at a right angle to the last recited portion.

References Cited in the file of this patent

UNITED STATES PATENTS

| | | |
|---|---|---|
| 2,281,958 | Snavely | May 5, 1942 |
| 2,647,225 | Cole et al. | July 28, 1953 |
| 2,869,043 | Locher | Jan. 13, 1959 |
| 2,883,587 | Dorfman | Apr. 21, 1959 |
| 2,910,629 | Casey | Oct. 27, 1959 |
| 2,910,630 | Hammerly | Oct. 27, 1959 |

FOREIGN PATENTS

| | | |
|---|---|---|
| 148,712 | Germany | Oct. 12, 1902 |
| 165,818 | Germany | Mar. 11, 1905 |
| 621,316 | Great Britain | Apr. 7, 1949 |

OTHER REFERENCES

Federal Noark Catalog, July 1953, pages 1, 2 and 3.